US007730288B2

(12) United States Patent
Luick (10) Patent No.: US 7,730,288 B2
(45) Date of Patent: Jun. 1, 2010

(54) METHOD AND APPARATUS FOR MULTIPLE LOAD INSTRUCTION EXECUTION

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 11/769,271

(22) Filed: Jun. 27, 2007

(65) Prior Publication Data

US 2009/0006818 A1 Jan. 1, 2009

(51) Int. Cl.
*G06F 9/312* (2006.01)
(52) U.S. Cl. ..................... 712/225; 712/207
(58) Field of Classification Search .................. None
See application file for complete search history.

(56) References Cited

U.S. PATENT DOCUMENTS

| | | | | |
|---|---|---|---|---|
| 5,710,912 A | * | 1/1998 | Schlansker et al. | 712/220 |
| 5,809,530 A | * | 9/1998 | Samra et al. | 711/140 |
| 6,185,660 B1 | * | 2/2001 | Mulla et al. | 711/140 |
| 6,658,555 B1 | * | 12/2003 | Kahle et al. | 712/219 |
| 6,912,648 B2 | * | 6/2005 | Hammarlund et al. | 712/219 |
| 7,185,178 B1 | * | 2/2007 | Barreh et al. | 712/206 |
| 7,418,578 B2 | * | 8/2008 | Nguyen et al. | 712/218 |
| 7,447,879 B2 | * | 11/2008 | Luick | 712/219 |
| 7,464,242 B2 | * | 12/2008 | Barrick et al. | 711/169 |
| 2004/0226011 A1 | * | 11/2004 | Augsburg et al. | 718/100 |

\* cited by examiner

*Primary Examiner*—Eric Coleman
(74) *Attorney, Agent, or Firm*—Patterson & Sheridan LLP; Robert R. Williams (57) ABSTRACT

A method and apparatus for executing instructions. The method includes receiving a first load instruction and a second load instruction. The method also includes issuing the first load instruction and the second load instruction to a cascaded delayed execution pipeline unit having at least a first execution pipeline and a second execution pipeline, wherein the second execution pipeline executes an instruction in a common issue group in a delayed manner relative to another instruction in the common issue group executed in the first execution pipeline. The method also includes accessing a cache by executing the first load instruction and the second load instruction. A delay between execution of the first load instruction and the second load instruction allows the cache to complete the access with the first load instruction before beginning the access with the second load instruction.

26 Claims, 7 Drawing Sheets

METHOD AND APPARATUS FOR MULTIPLE LOAD INSTRUCTION EXECUTION

BACKGROUND OF THE INVENTION

1. Field of the Invention

The present invention generally relates to executing instructions in a processor. Specifically, this application is related to minimizing stalls in a processor when executing load instructions.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core.

To provide for faster access to data and instructions as well as better utilization of the processor, the processor may have several caches. A cache is a memory which is typically smaller than the main memory and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2 Cache (L2 cache). In some cases, the processor may have other, additional cache levels (e.g., an L3 cache and an L4 cache).

Processors typically provide load and store instructions to access information located in the caches and/or main memory. A load instruction may include a memory address (provided directly in the instruction or using an address register) and identify a target register (Rt). When the load instruction is executed, data stored at the memory address may be retrieved (e.g., from a cache, from main memory, or from other storage means) and placed in the target register identified by Rt. Similarly, a store instruction may include a memory address and a source register (Rs). When the store instruction is executed, data from Rs may be written to the memory address. Typically, load instructions and store instructions utilize data cached in the L1 cache.

In some cases, a processor may be capable of executing multiple load instructions simultaneously. However, the cache used by the processor core may only be configured to perform a limited number of load accesses at a given time. To prevent the cache from being overloaded by too many load accesses, the processor core may limit the number of load instructions which can be simultaneously executed, for example, by issuing only a single load instruction for execution at a time. Limiting the number of load instructions issued by the processor may reduce the overall speed with which instructions are executed by the processor. Thus, executing multiple load instructions in a processor may decrease processor efficiency.

Accordingly, there is a need for improved methods of executing load instructions.

SUMMARY OF THE INVENTION

The present invention generally provides a method and apparatus for executing load instructions. In one embodiment, the method includes receiving a first load instruction and a second load instruction. The method also includes issuing the first load instruction and the second load instruction to a cascaded delayed execution pipeline unit having at least a first execution pipeline and a second execution pipeline, wherein the second execution pipeline executes an instruction in a common issue group in a delayed manner relative to another instruction in the common issue group executed in the first execution pipeline. The method also includes accessing a cache by executing the first load instruction and the second load instruction. A delay between execution of the first load instruction and the second load instruction allows the cache to complete the access with the first load instruction before beginning the access with the second load instruction.

One embodiment of the invention also provides a processor including a cache and a cascaded delayed execution pipeline unit having at least a first execution pipeline and a second execution pipeline, wherein the first execution pipeline executes an instruction in a common issue group in a delayed manner relative to another instruction in the common issue group executed in the second execution pipeline. The processor also includes circuitry configured to receive a first load instruction and a second load instruction and issue the first load instruction and the second load instruction to the cascaded, delayed execution pipeline. The circuitry is further configured to access the cache by executing the first load instruction and the second load instruction. The circuitry is configured to schedule a delay between execution of the first load instruction and the second load instruction, thereby allowing the cache to complete the access with the first load instruction before beginning the access with the second load instruction.

One embodiment of the invention provides a method of executing instructions in a processor. The method includes receiving a first load instruction and a second load instruction in a common issue group. The first load instruction and the second load instruction are issued to a cascaded delayed execution pipeline unit having at least a first execution pipeline and a second execution pipeline. The second execution pipeline executes the second load instruction in the common issue group in a delayed manner relative to the first load instruction in the common issue group executed in the first execution pipeline. After the first load instruction and the second load instruction have been issued from an issue queue, the second load instruction is maintained in a delay queue for at least a period of time during which the first load instruction is being executed. A cache is accessed by executing the first load instruction and the second load instruction. A delay between execution of the first load instruction and the second load instruction provided by the delay queue allows the cache to complete the access with the first load instruction before beginning the access with the second load instruction.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method and apparatus for executing load instructions. In one embodiment, the method includes receiving a first load instruction and a second load instruction. The method also includes issuing the first load instruction and the second load instruction to a cascaded delayed execution pipeline unit having at least a first execution pipeline and a second execution pipeline, wherein the second execution pipeline executes an instruction in a common issue group in a delayed manner relative to another instruction in the common issue group executed in the first execution pipeline. The method also includes accessing a cache by executing the first load instruction and the second load instruction. A delay between execution of the first load instruction and the second load instruction allows the cache to complete the access with the first load instruction before beginning the access with the second load instruction.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

While described below with respect to a processor having multiple processor cores and multiple L1 caches, wherein each processor core uses multiple pipelines to execute instructions, embodiments of the invention may be utilized with any processor which utilizes a cache, including processors which have a single processing core. In general, embodiments of the invention may be utilized with any processor and are not limited to any specific configuration. Furthermore, while described below with respect to a processor having an L1-cache divided into an L1 instruction cache (L1 I-cache, or I-cache) and an L1 data cache (L1 D-cache, or D-cache), embodiments of the invention may be utilized in configurations wherein a unified L1 cache is utilized. Also, while described below with respect to an L1 cache which utilizes an L1 cache directory, embodiments of the invention may be utilized wherein a cache directory is not used.

Overview of an Exemplary System

Figure 1:
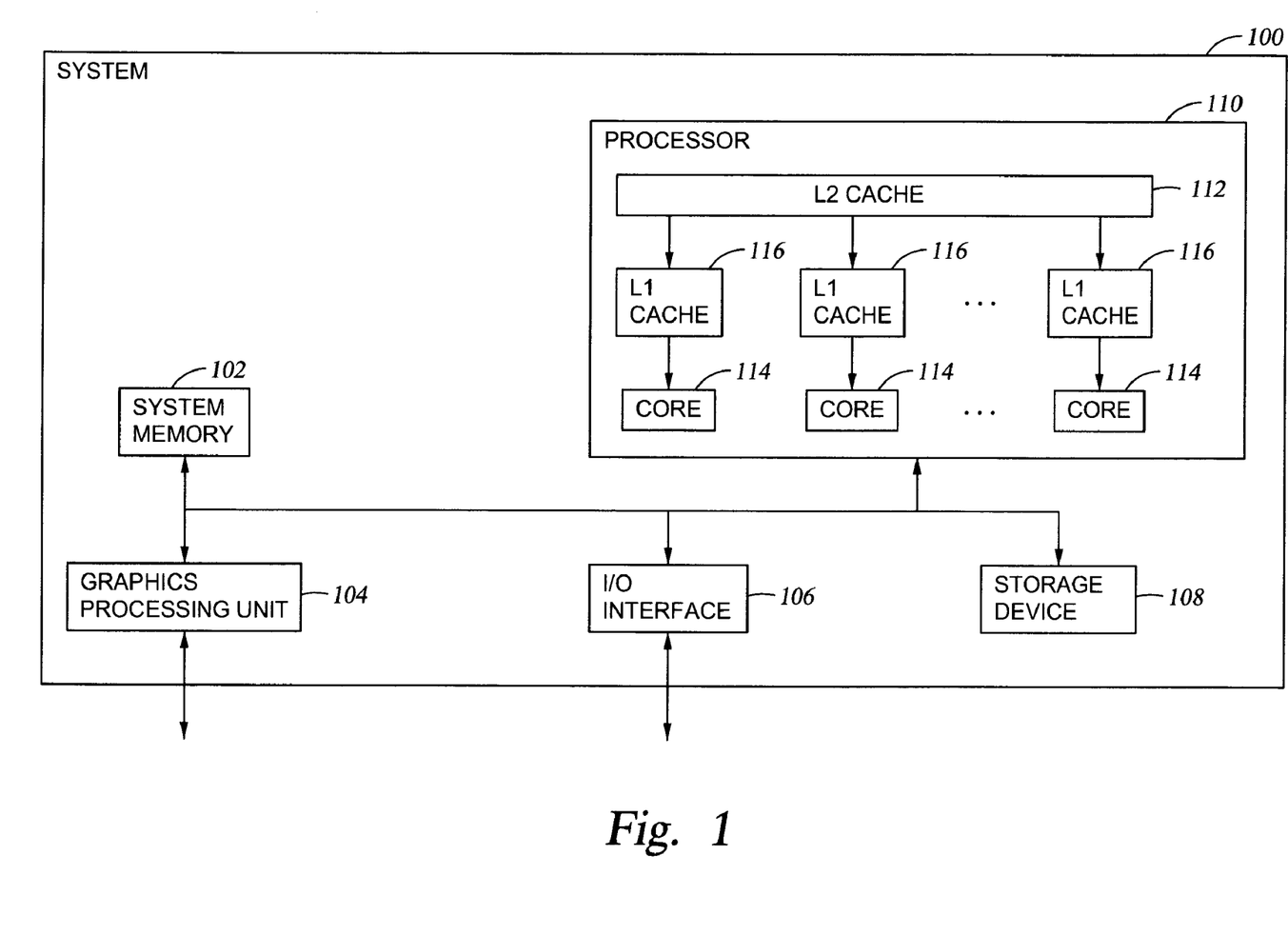
FIG. 1 is a block diagram depicting a system according to one embodiment of the invention.

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
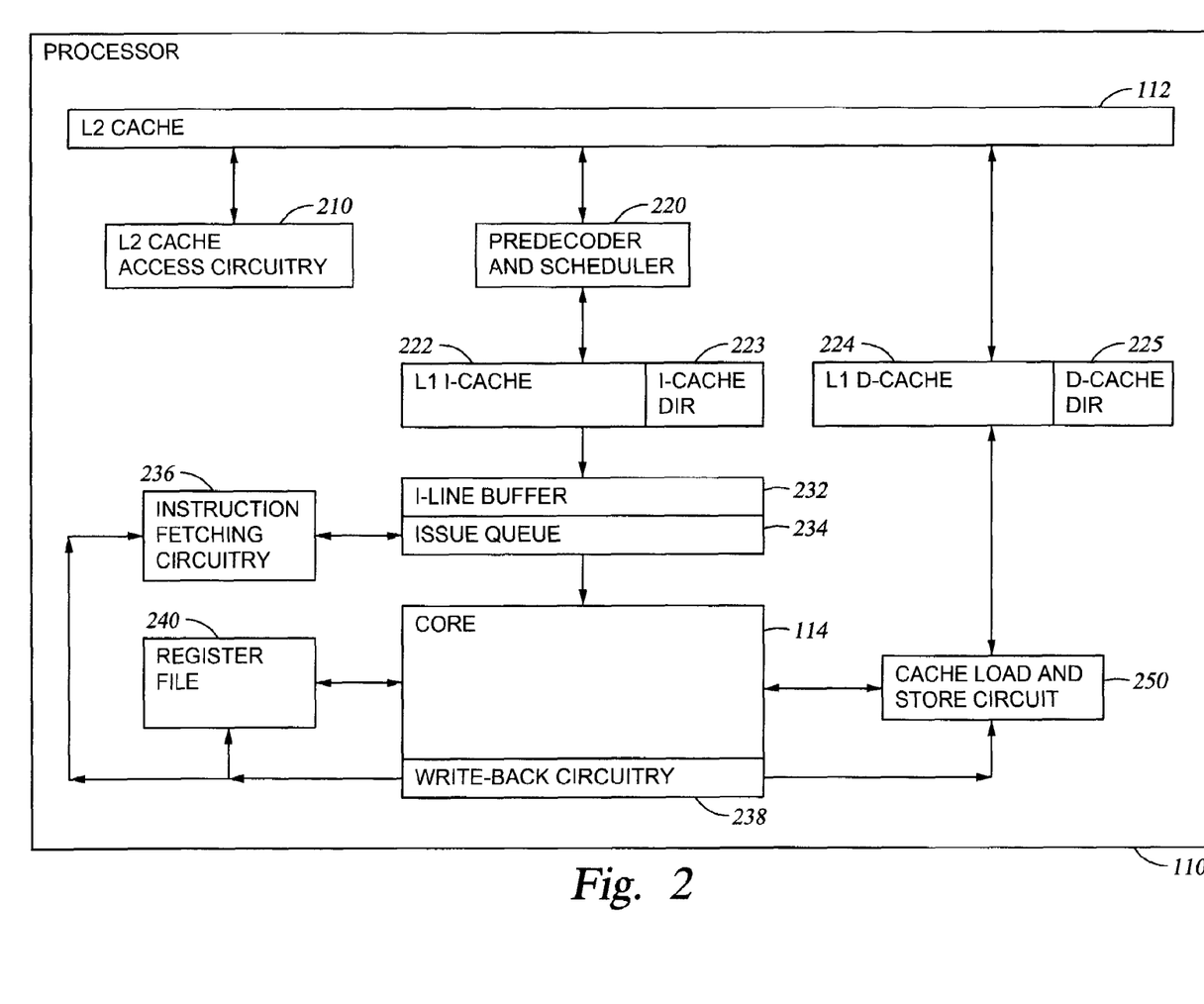
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., contain identical pipelines with identical pipeline stages). In another embodiment, each core 114 may be different (e.g., contain different pipelines with different stages).

In one embodiment of the invention, the L2 cache 112 may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache 112. When the processor core 114 requests instructions from the L2 cache 112, the instructions may be first processed by a predecoder and scheduler 220.

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

I-lines retrieved from the L2 cache 112 may be processed by the predecoder and scheduler 220 and the I-lines may be placed in the I-cache 222. To further improve processor performance, instructions may be predecoded, for example, when the I-lines are retrieved from L2 (or higher) cache and before the instructions are placed in the L1 cache 116. Such predecoding may include various functions, such as address generation, branch prediction, and scheduling (determining an order in which the instructions should be issued), which is captured as dispatch information (a set of flags) that control instruction execution. Embodiments of the invention may also be used where decoding is performed at another location in the processor 110, for example, where decoding is performed after the instructions have been retrieved from the L1 cache 116.

In some cases, the predecoder and scheduler 220 may be shared among multiple cores 114 and L1 caches 116. Similarly, D-lines fetched from the L2 cache 112 may be placed in the D-cache 224. A bit in each I-line and D-line may be used to track whether a line of information in the L2 cache 112 is an I-line or D-line. Optionally, instead of fetching data from the L2 cache 112 in I-lines and/or D-lines, data may be fetched from the L2 cache 112 in other manners, e.g., by fetching smaller, larger, or variable amounts of data.

In one embodiment, the I-cache 222 and D-cache 224 may have an I-cache directory 223 and D-cache directory 225 respectively to track which I-lines and D-lines are currently in the I-cache 222 and D-cache 224. When an I-line or D-line is added to the I-cache 222 or D-cache 224, a corresponding entry may be placed in the I-cache directory 223 or D-cache directory 225. When an I-line or D-line is removed from the I-cache 222 or D-cache 224, the corresponding entry in the I-cache directory 223 or D-cache directory 225 may be removed. While described below with respect to a D-cache 224 which utilizes a D-cache directory 225, embodiments of the invention may also be utilized where a D-cache directory 225 is not utilized. In such cases, the data stored in the D-cache 224 itself may indicate what D-lines are present in the D-cache 224.

In one embodiment, instruction fetching circuitry 236 may be used to fetch instructions for the core 114. For example, the instruction fetching circuitry 236 may contain a program counter which tracks the current instructions being executed in the core 114. A branch unit within the core 114 may be used to change the program counter when a branch instruction is encountered. An I-line buffer 232 may be used to store instructions fetched from the L1 I-cache 222. The issue queue 234 and associated circuitry may be used to group instructions in the I-line buffer 232 into instruction groups which may then be issued in parallel to the core 114 as described below. In some cases, the issue queue 234 may use information provided by the predecoder and scheduler 220 to form appropriate instruction groups.

In addition to receiving instructions from the issue queue 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) before the D-cache access is completed.

In some cases, data may be modified in the core 114. Modified data may be written to the register file 240, or stored in memory 102. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, the write-back circuitry 238 may also be used to write instructions back to the I-cache 222.

As described above, the issue queue 234 may be used to form instruction groups and issue the formed instruction groups to the core 114. The issue queue 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Figure 3:
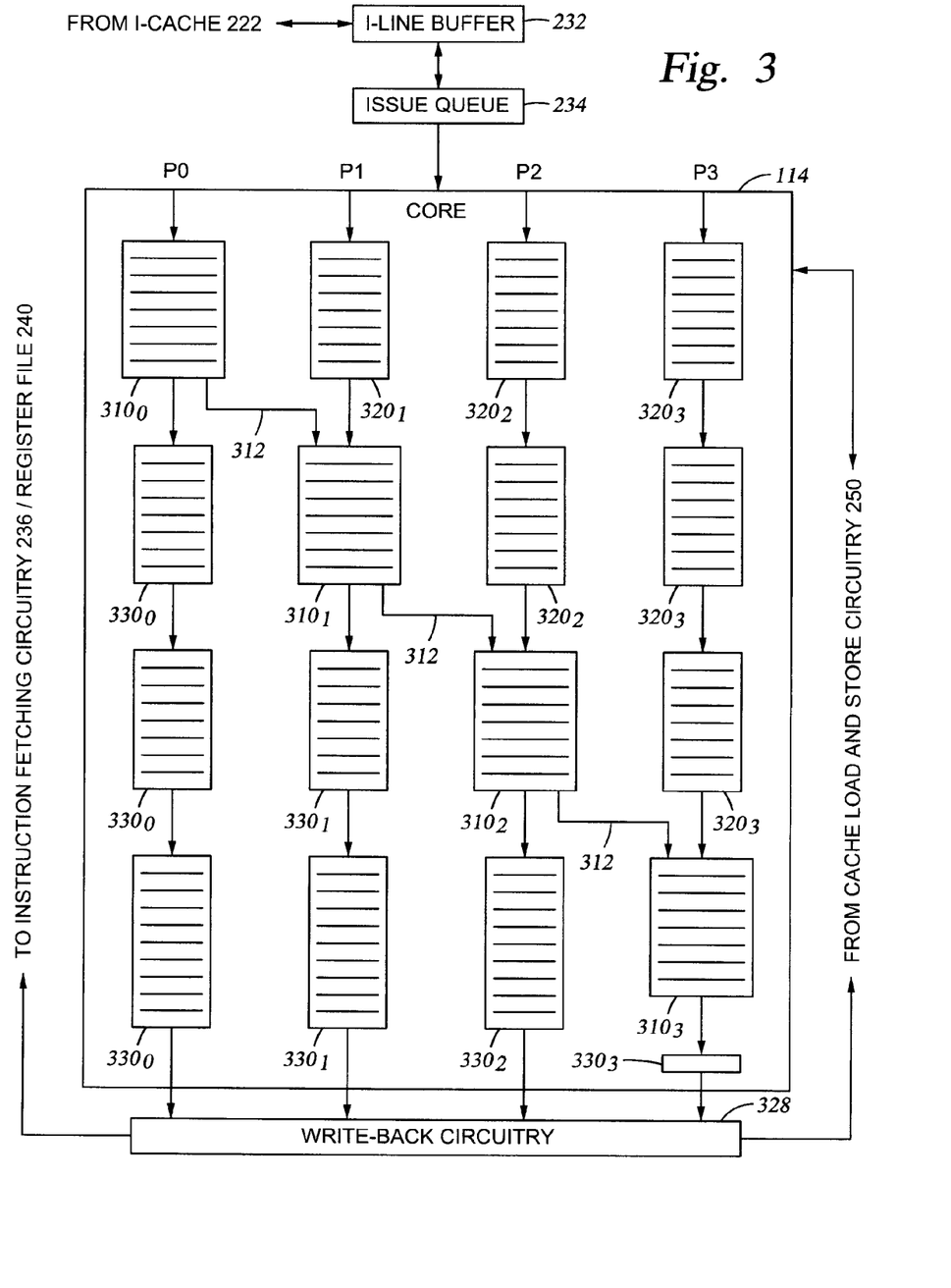
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, and P3) in the cascaded, delayed execution pipeline configuration may contain an execution unit 310. The execution unit 310 may perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit 310 may also read data from a register file 240, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry 238, as well as any other circuitry, to perform these functions.

In one embodiment, each execution unit 310 may perform the same functions (e.g., each execution unit 310 may be able to perform load/store functions). Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where four instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on. I0 may be executed immediately in execution unit $310_0$. Later, after instruction I0 has finished being executed in execution unit $310_0$, execution unit $310_1$ may begin executing instruction I1, and so one, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions not being executed by an execution unit 310 may be held in a delay queue 320 or a target delay queue 330. The delay queues 320 may be used to hold instructions in an instruction group which have not been executed by an execution unit 310. For example, while instruction I0 is being executed in execution unit $310_0$, instructions I1, I2, and I3 may be held in a delay queue 330. Once the instructions have moved through the delay queues 330, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 306 may be used to write back the most recently modified value of a register and discard invalidated results.

Executing Multiple Load Instructions

One embodiment of the invention provides a method for executing load instructions. As described above, in some cases, the L1 cache 116 (e.g., in the L1 D-cache 224, or in a unified L1 cache 116) may only be configured to perform a limited number of accesses during a given time period. The L1 cache 116 may be limited to performing a single load operation at a time. For example, the L1 cache 116 may include a single port from which load operations can be performed. Optionally, the L1 cache 116 may be limited to performing two or more (e.g., an integer number) of accesses at a time. Also, in some cases, an L1 cache access may last for one or more clock cycles before another cache access may be initiated (e.g., it may take a first load instruction three clock cycles to complete an L1 cache access during which time the L1 cache 116 may not be used to perform another load operation).

As described below, by scheduling execution of the load instructions in a processor core 114 which utilizes a cascaded, delayed execution pipeline configuration, the load instructions may be executed with reduced or no delay. Furthermore, in some cases, execution of the load instructions in the processor core 114 may be performed without unnecessarily stalling or idling pipelines within the processor core 114 (e.g., without issuing "no operation" (NOP) instructions to the processor core 114).

Figure 4A:
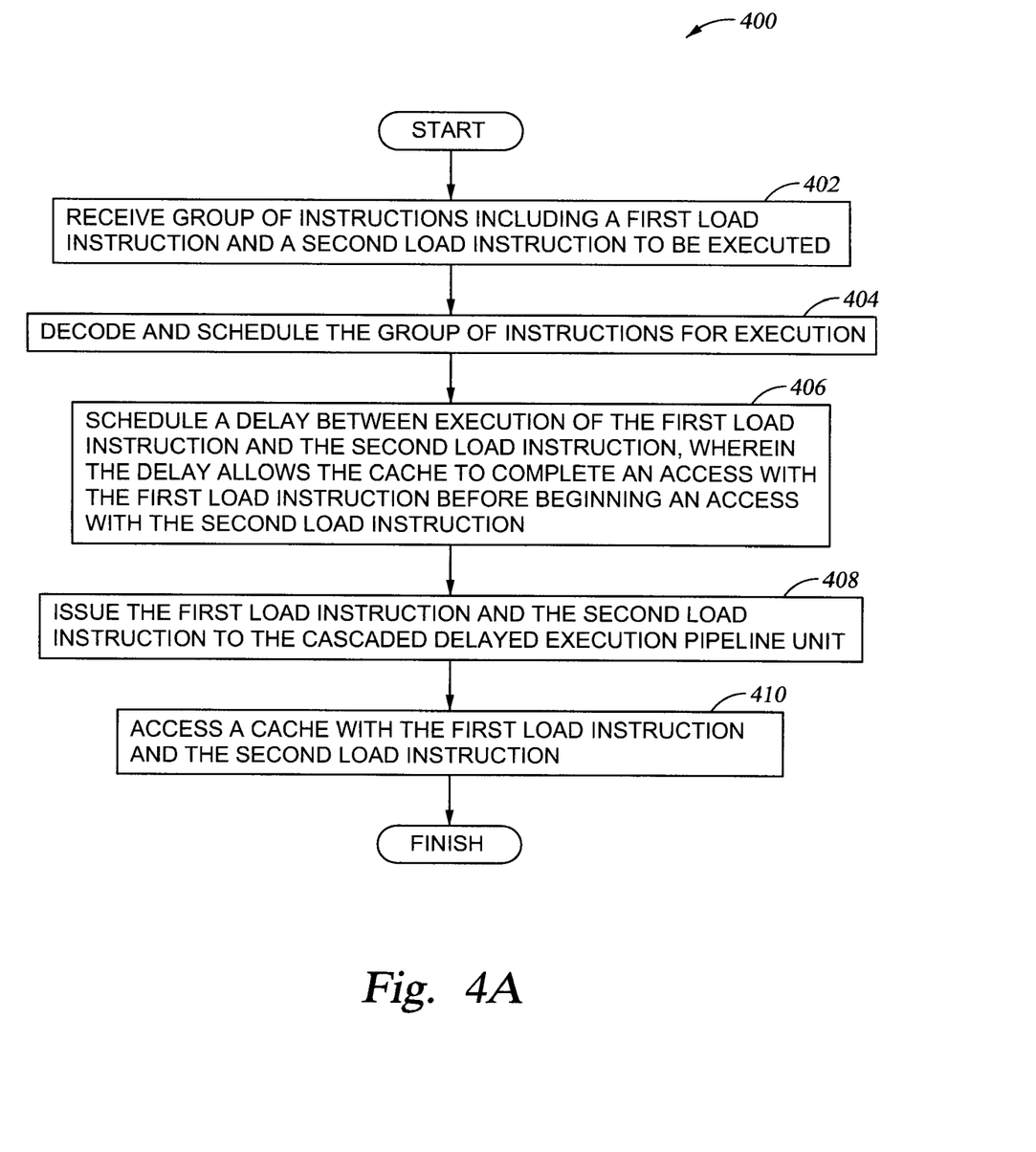
FIGS. 4A-B are flow diagrams depicting processes for executing instructions according to embodiments of the invention.

FIG. 4A is a flow diagram depicting a process 400 for executing load instructions. The process may begin at step 402 where a group of instructions including a first load instruction and a second load instruction to be executed are received. At step 404, the instructions may be decoded and scheduled for execution. For example, as mentioned above, decoding may be performed by the predecoder and scheduler 220 as the instructions are fetched from the L2 cache 112 and placed in the L1 cache 116. Optionally, decoding may be performed at any appropriate time, including after the instructions have be fetched from the L1 cache 116 (e.g., as a decoding stage during execution of the instruction in an execution unit 310).

At step 406, a delay may be scheduled between execution of the first load instruction and the second load instruction. The delay may allow the L1 cache 116 to complete an access for the first load instruction before beginning an access with the second load instruction. As described below, the delay may be scheduled, for example, by scheduling the second load instruction to a second pipeline in which execution is delayed with respect to a first pipeline in which the first load instruction is issued. The delay may also be provided by scheduling the first load instruction and the second load instruction to the same pipeline, thereby allowing the access for the first load instruction to complete before beginning the access for the second load instruction.

At step 408, the first load instruction and the second load instruction may be issued to the cascaded, delayed execution pipeline unit in the processor core 114, and at step 410, the L1 cache 116 may be accessed with the first load instruction and the second load instruction. As described above, the execution of the second load instruction may begin after a delay with respect to the first load instruction. The delay may either be provided by maintaining the second instruction in a delay queue 320 which provides an appropriate delay (e.g., enough delay to allow the access for the first instruction to complete) or by scheduling sequential execution of the first load instruction and the second load instruction in the same pipeline.

Figure 4B:
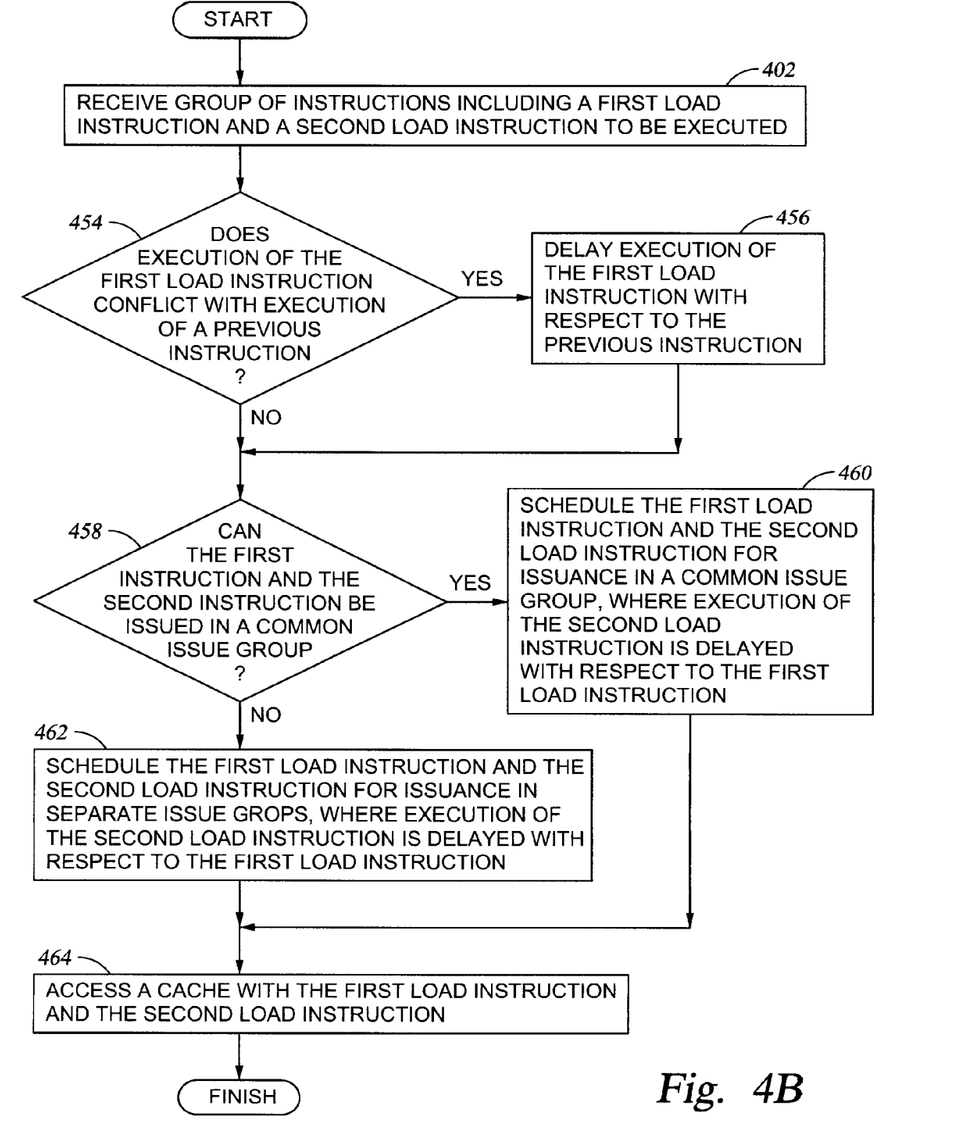

As described with respect to FIG. 4A, scheduling and decoding may be performed after the first load instruction and the second load instruction have been fetched (e.g., from the L2 cache 112 or the L1 cache 116). FIG. 4B is a flow diagram depicting a process 450 for scheduling execution of load instructions which may be performed during decoding and scheduling according to one embodiment of the invention. The process 450 may be used, for example, to generate scheduling information which is used by the processor core 114 when executing the first load instruction and the second load instruction.

The process 450 may begin at step 402 where a group of instructions including the first load instruction and the second load instruction to be executed are received, e.g., by the predecoder and scheduler 220. At step 454, a determination may be made of whether the first load instruction conflicts with a previous instruction. For example, if a store instruction is scheduled for execution before execution of the first load instruction and the store instruction stores data to an address from which the load instruction loads data, the load instruction and the store instruction may, in some cases, conflict. In the case of such a conflict (or any other conflict), execution of the first load instruction may be delayed at step 456 with respect to the previous instruction. The delay of the first load instruction may be performed, for example, by scheduling the first load instruction to a pipeline in which execution is delayed (e.g., by a delay queue 310) with respect to the pipeline in which the conflicting instruction is executed. The delay may also be provided using any alternative delay method known to those skilled in the art.

In some cases, the first load instruction and the second load instruction may not properly be executed in the same instruction group. For example, multiple instructions may be scheduled for execution between the first load instruction and the second load instruction. In other cases, conflicts between the first load instruction and/or second load instruction and other instructions may prevent the first load instruction and the second load instruction from being issued in the same issue group. Thus, in one embodiment, a determination may be made of whether the first load instruction and the second load instruction can be issued in a common issue group at step 458. If the first load instruction and the second load instruction can be issued in a common issue group, then at step 460, the first load instruction and the second load instruction may be scheduled for issuance in a common issue group where execution of the second load instruction is delayed with respect to execution of the first load instruction as described above.

If the first load instruction and the second load instruction cannot be issued in a common issue group, then at step 462, the first load instruction and the second load instruction may be scheduled for issuance in separate issue groups. Execution of the second load instruction may be delayed with respect to execution of the first load instruction, for example, by issuing the first load instruction and the second load instruction to the same pipeline, or by issuing the first load instruction to a first pipeline which has no delay or a reduced delay with respect to the pipeline to which the second load instruction is issued. At step 464, the cache (e.g., the L1 cache 116) may be access with the first load instruction and the second load instruction as described above.

While described above with respect to a first load instruction and a second load instruction, embodiments of the invention may also be used where three or more load instructions are executed. For example, where three load instructions are to be executed, a delay may be scheduled between each load instruction as described above (e.g., by scheduling each instruction to the same pipeline, to separate pipelines with increasing delays, or a combination thereof).

In one embodiment, where the L1 cache 116 is capable of performing two or more accesses at a time, appropriate delays may also be provided using the methods described above. For example, if the L1 cache 116 is capable of performing two accesses simultaneously and three load instructions are being executed, then the first and second load instruction may be scheduled for execution simultaneously (presuming the first and second load instruction are not dependent on each other) while a delay may be provided between the accesses for the first and second load instruction and the access for the third load instruction.

In some cases, if the first load instruction and the second load instruction are dependent (e.g., if the second load instruction uses results of the first load instruction), then execution of the second load instruction may be delayed with respect to execution of the first load instruction even if the L1 cache 116 is capable of executing the first load instruction and the second load instruction simultaneously. The delay scheduled between the first load and the second load instruction may be sufficient to allow the dependency between the first load instruction and the second load instruction to be resolved (e.g., the delay may allow the access for the first load instruction to complete before initiating the access for the dependent second load instruction).

While described above with respect to a first load instruction and a second load instruction, the first load instruction and the second load instruction may not necessarily be the first instruction in program order and the second instruction in program order, respectively. For example, after the source code for the program has been compiled, the second instruction may be placed in program order before the first instruction. However, where the processor core 114 is configured for out-of-order execution, the first load instruction may be executed before the second load instruction out of program order. Optionally, where out-of-order execution is not desired or unavailable, the first load instruction and the second load instruction may be executed in program order as appropriate.

Also, in one embodiment, the first load instruction and the second load instruction may not be in the same thread. For example, the processor core 114 may be configured to execute instructions from a first thread and a second thread simultaneously. Thus, the first load instruction and the second load instruction may be in the first thread and the second thread, respectively.

In one embodiment of the invention, the first load instruction and the second load instruction may be scheduled for execution without placing any stalls in the pipelines to delay execution of the second load instruction with respect to the first load instruction. Thus, in some cases, "no operation" (NOP) instructions may not be used when providing a delay for the second instruction with respect to the first load instruction. The delay may instead be provided by scheduling the first load instruction and the second load instruction to be executed in the same pipeline or in pipelines which are delayed with respect to one another, as described above. Because the cascaded, delayed execution core 114 may not be stalled when executing the first load instruction and the second load instruction, the processor core 114 may maintain increased efficiency (e.g., by executing other instructions while the second load instruction is delayed).

In one embodiment of the invention, when the first load instruction and the second load instruction are scheduled to be executed, scheduling information may be generated which indicates when the first load instruction and the second load instruction may attempt to access the L1 cache 116 simultaneously. Based on the scheduling information, the execution of the first load instruction and second load instruction may be scheduled in such a manner that the first load instruction completes an access of the L1 cache 116 before the access for the second load instruction is initiated. For example, as described above, execution of the second load instruction may be delayed with respect to execution of the first load instruction such that the first load instruction completes an access of the L1 cache 116 before the access for the second load instruction is initiated.

Figure 5A:
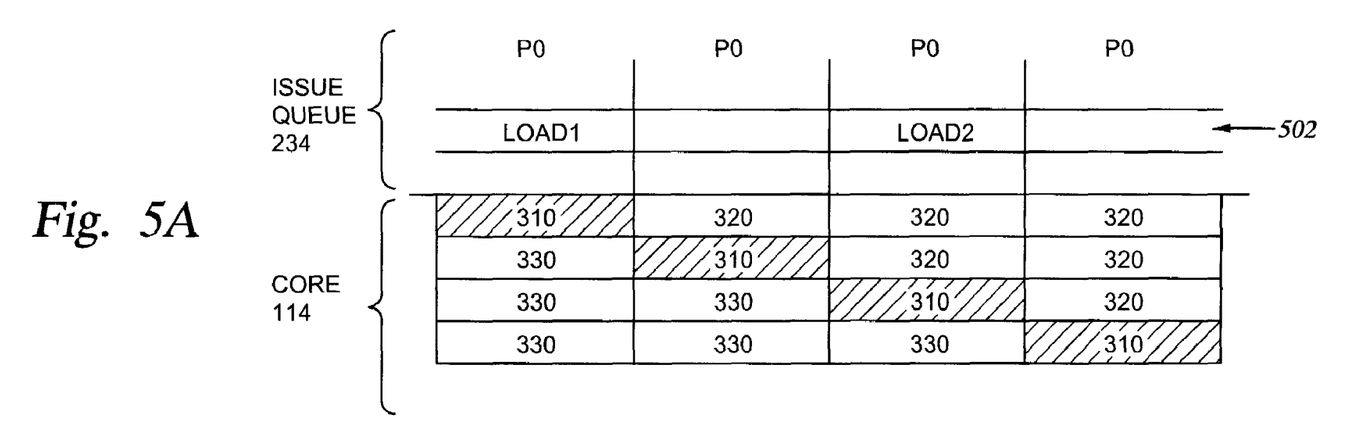
FIGS. 5A-B are block diagrams depicting scheduling of load instructions according to embodiments of the invention.

FIG. 5A is a diagram depicting scheduling of load instructions in a common issue group 502 according to one embodiment of the invention. As depicted, the first load instruction (LOAD1) and the second load instruction (LOAD2) may be placed in the common issue group 502 in the issue queue 234 and issued simultaneously to separate pipelines (e.g., P0 and P2) in the processor core 114. The first load instruction may be issued to a pipeline (P0) in which execution is not delayed (or less delayed) with respect to the pipeline (P2) to which the second load instruction is issued. By placing the second load instruction in a delayed execution pipeline, the execution of the second load instruction may be delayed as described above. For example, the delay in execution of the second load instruction may allow the L1 cache 116 to complete an access using the first instruction before beginning execution of the second load instruction. Because the second load instruction may be held in a delay queue 320 for pipeline P2 while the first load instruction is being executed, the execution unit 310 for the pipeline P2 to which the load instruction is issued may still be utilized to execute other, previously issued instructions, thereby increasing overall efficiency of the processor 110. Other pipelines (P1, P3) may also provide sufficient delay in execution of the second load instruction to allow the access for the first load instruction to complete.

Figure 5B:
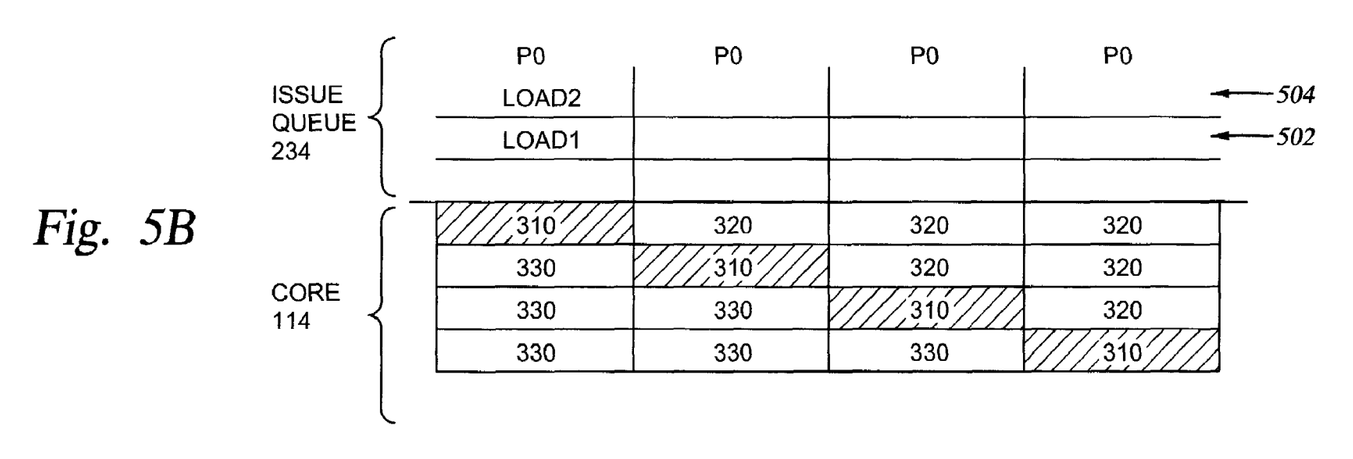

In some cases, the first load instruction and the second load instruction may be issued to the same pipeline in order to allow the first instruction to complete an access of the L1 cache 116 before accessing the L1 cache 116 with the second instruction. FIG. 5B is a diagram depicting scheduling of a first load instruction and a second load instruction to the same pipeline (e.g., P0) according to one embodiment of the invention. As depicted, the load and store instructions may be issued from the issue queue 234 in separate issue groups 502, 504 to the same pipeline (P0). By issuing the first load instruction and the second load instruction to the same pipeline, execution of the second load instruction may be delayed with respect to execution of the first load instruction. By delaying execution of the second load instruction, the L1 cache 116 may complete an access using the first instruction before beginning execution of the second load instruction. The first load instruction and second load instruction may also be scheduled to other pipelines (e.g., P1, P2, or P3), or optionally, to different pipelines which have an equal amount of delay (e.g., if another pipeline P4 has a delay equal to the delay of pipeline P0, the load instruction or the store instruction may be scheduled for execution in order in either pipeline P0 or P4).

In some cases, to schedule execution of first load instruction and second load instruction as described above, the issue groups in which load instructions would otherwise be placed (e.g., a default issue group) may be modified. For example, an issue group may generally contain a single instruction issued to each pipeline (e.g., four instructions issued to P0, P1, P2, P3, respectively). However, to issue the load instructions as described above (for example, in a common issue group or to the same pipeline in separate issue groups), some issue groups may be created in which less than four instructions are issued.

In some cases, different execution units 310 may provide different functionality. For example, execution units $310_0$ and $310_2$ may provide load/store functionality (and thus be used to execute load and store instructions) while execution units $310_1$ and $310_3$ may provide arithmetic and logical capabilities (and thus be used to execute arithmetic and logical instructions). Thus, when the scheduling information indicates that a first load instruction and a second load instruction may attempt to access the L1 cache 116 simultaneously, the scheduling options (described above) may be utilized in conjunction with the functionality constraints in order to properly schedule execution of the first load instruction and the second load instruction. For example, as depicted in FIG. 5A, the second load instruction may be issued in a common issue group with the first load instruction, and within the issue group the first load instruction may be issued to pipeline P0 and the second load instruction may be issued to pipeline P2, thereby satisfying the scheduling requirements as well as the functionality constraints. Optionally, in some cases, each of the pipelines P0, P1, P2, P3 in the processor core 114 may provide the functionality necessary to execute a load instruction, as well as other instructions.

Figure 6A:
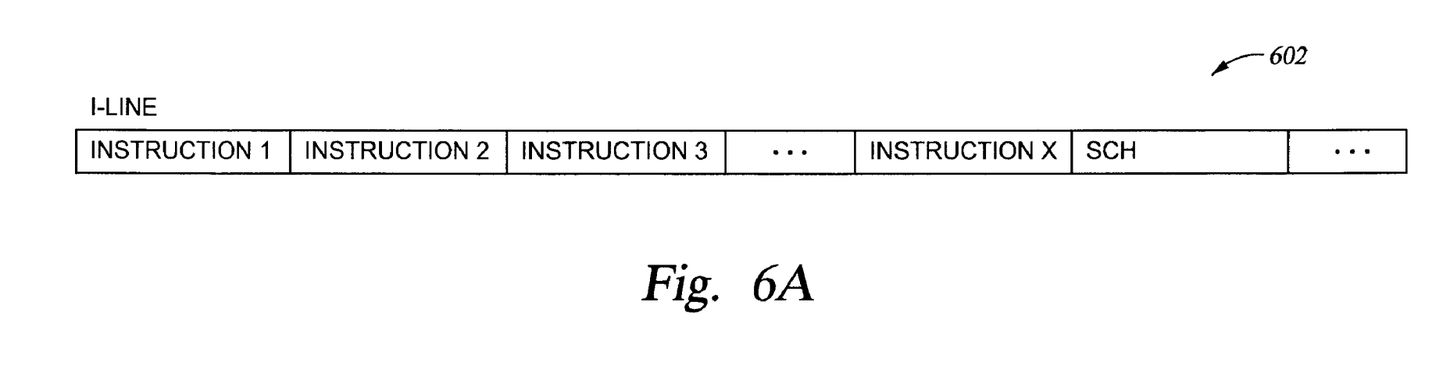
FIGS. 6A-B are block diagrams depicting exemplary cache lines and instructions according to embodiments of the invention.

In one embodiment, scheduling information may be stored in an I-line containing the first load instruction and/or the second load instruction (e.g., by re-encoding the information in an instruction or by appending the data to the I-line). FIG. 6A is a block diagram depicting an exemplary I-line 602 used to store scheduling information (SCH) load instructions in the I-line 602 according to one embodiment of the invention.

Figure 6B:
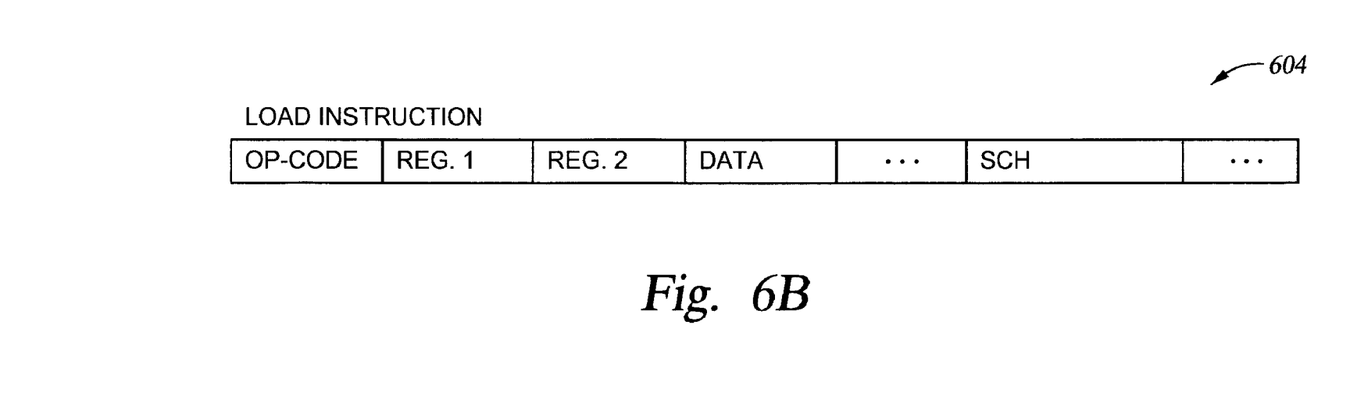

As depicted, the I-line 602 may contain multiple instructions (Instruction 1, Instruction 2, etc.), bits used to store scheduling information. During execution, the scheduling information may be used to schedule execution of the load instructions as described above. In some cases, scheduling information may be stored in the load instructions after the instructions are decoded and/or executed (referred to a re-encoding). FIG. 6B is a block diagram depicting an exemplary re-encoded store instruction 604 according to one embodiment of the instruction. The load instruction 604 may contain an Operation Code (Op-Code) used to identify the type of instruction, one or more register operands (Reg. 1, Reg. 1), and/or data. As depicted, the load instruction 604 may also contain bits used to store scheduling information (SCH) as well as other information. The scheduling information may also be used to schedule execution of the instruction 604.

In one embodiment of the invention, scheduling information is stored in I-lines (e.g., appended to the I-line or in an instruction), each level of cache and/or memory used in the system 100 may contain a copy of the information contained in the I-lines. In another embodiment of the invention, only specified levels of cache and/or memory may contain the information contained in the instructions and/or I-line. Cache coherency principles, known to those skilled in the art, may be used to update copies of the I-line in each level of cache and/or memory.

It is noted that in traditional systems which utilize instruction caches, instructions are typically not modified by the processor 110 (e.g., instructions are read-only). Thus, in traditional systems, I-lines are typically aged out of the I-cache 222 after some time instead of being written back to the L2 cache 112. However, as described herein, in some embodiments, modified I-lines and/or instructions may be written back to the L2 cache 112, thereby allowing the scheduling information to be maintained at higher cache and/or memory levels.

As an example, when instructions in an I-line have been processed by the processor core 114 (possible causing the scheduling information to be updated), the I-line may be written back to one or more levels of the cache including the I-cache 222 and the L2 cache 112. In one embodiment, the I-line may optionally be written back to several cache levels at once (e.g., to the L2 cache 112 and the I-cache 222) or to a level other than the I-cache 222 (e.g., directly to the L2 cache 112). Because instructions are typically read-only (e.g., because instructions are typically not modified after the original program is executed), additional circuitry for writing instruction information from the I-cache 222 or processor core 114 back to the L2 Cache 112 may also be provided.

Optionally, in some cases, where a store-through from the D-cache 224 to the L2 cache 112 is utilized such that data written back to the D-cache 224 is automatically written back to the L2 cache 112 as well (allowing both caches to contain identical copies of the data), a separate path from the D-cache 224 to the L2 cache 112 may be provided for performing the store-through. In one embodiment of the invention, the store-through path may also be utilized for writing instructions and/or I-line flags back from the I-cache 222 to the L2 cache 112, thereby allowing the D-cache 224 and I-cache 222 to share the bandwidth of the store-through path.

In some cases, the scheduling information may also be encoded in the instruction when the instruction is compiled from higher level source code. For example, in one embodiment, the compiler may be designed to recognize where a first load instruction and a second load instruction may attempt to access the L1 cache 116 simultaneously and provide scheduling bits in the instructions accordingly.

Optionally, once the source code of a program has been created, the source code may be compiled into instructions and the instructions may then be executed during a test execution. The test execution and the results of the test execution may be monitored to determine scheduling information for the instructions. The source code may then be recompiled such that the scheduling information is set to appropriate values in light of the test execution. In some cases, the test execution may be performed on the processor 110. In some cases, control bits or control pins in the processor 110 may be used to place the processor 110 in a special test mode for the test execution. Optionally, a special processor, designed to perform the test execution and monitor the results may be utilized.

Further Exemplary Embodiments

In one embodiment of the invention, scheduling information may be continuously tracked and updated at runtime such that the information and other stored values may change over time as a given set of instructions is executed. Thus, the scheduling information may be dynamically modified, for example, as a program is executed.

In another embodiment of the invention, scheduling information may be stored during an initial execution phase of a set of instructions (e.g., during an initial "training" period in which a program is executed). The initial execution phase may also be referred to as an initialization phase or a training phase. During the training phase, scheduling information may be tracked and stored (e.g., in the I-line containing the instruction or in a special cache) according to the criteria described above. When the training phase is completed, the stored information may continue to be used to schedule execution of instructions as described above.

In one embodiment, one or more bits (stored, for example, in the I-line containing the load instruction or in a special cache or register) may be used to indicate whether an instruction is being executed in a training phase or whether the processor 110 is in a training phase mode. For example, a mode bit in the processor 110 may be cleared during the training phase. While the bit is cleared, the scheduling information may be updated as described above. When the training phase is completed, the bit may be set. When the bit is set, the scheduling information may no longer be updated and the training phase may be complete.

In one embodiment, the training phase may continue for a specified period of time (e.g., until a number of clock cycles has elapsed, or until a given instruction has been executed a number of times). In one embodiment, the most recently stored scheduling information may remain stored when the specified period of time elapses and the training phase is exited. Also, in one embodiment, the training phase may continue until a given I-line has been executed a threshold number of times. For example, when the I-line is fetched from a given level of cache (e.g., from main memory 102, the L3 cache, or the L2 cache 112), a counter (e.g., a two or three bit counter) in the I-line may be reset to zero. While the counter is below a threshold number of I-line executions, the training phase may continue for instructions in the I-line. After each execution of the I-line, the counter may be incremented. After the threshold number of executions of the I-line, the training phase for instructions in the I-line may cease. Also, in some cases, different thresholds may be used depending upon the instructions in the I-line which are being executed (e.g., more training may be used for instructions which have outcomes varying to a greater degree). In another embodiment of the invention, the training phase may continue until one or more exit criteria are satisfied.

In another embodiment of the invention, the scheduling information may be modified in intermittent training phases. For example, a frequency and duration value for each training phase may be stored. Each time a number of clock cycles corresponding to the frequency has elapsed, a training phase may be initiated and may continue for the specified duration value. In another embodiment, each time a number of clock cycles corresponding to the frequency has elapsed, the training phase may be initiated and continue until specified threshold conditions are satisfied (for example, until a specified level of scheduling predictability is reached).

While embodiments of the invention are described above with respect to a processor utilizing a cascaded, delayed execution pipeline unit, and with respect to a processor having multiple cores 114, embodiments of the invention may be utilized with any processor, including conventional processors which may not utilize cascaded, delayed execution pipeline units or multiple cores. Alternate, suitable configurations should be readily apparent to those of ordinary skill in the art.

While the foregoing is directed to embodiments of the present invention, other and further embodiments of the invention may be devised without departing from the basic scope thereof, and the scope thereof is determined by the claims that follow.

What is claimed is:

1. A method of executing instructions in a processor, the method comprising:

receiving a first load instruction and a second load instruction;

issuing the first load instruction and the second load instruction to a cascaded delayed execution pipeline unit having at least a first execution pipeline and a second execution pipeline, wherein the second execution pipeline executes an instruction in a common issue group in a delayed manner relative to another instruction in the common issue group executed in the first execution pipeline;

accessing a cache by executing the first load instruction and the second load instruction, wherein a delay between execution of the first load instruction and the second load instruction allows the cache to complete the access with the first load instruction before beginning the access with the second load instruction;

and wherein the first load instruction and the second load instruction are decoded and scheduled for execution after the first load instruction and the second load instruction are fetched from a level two cache and before the first load instruction and the second load instruction are placed in a level one cache.

2. The method of claim 1, wherein the first load instruction and the second load instruction are issued in a common issue group, wherein the first load instruction is issued to the first execution pipeline and wherein the second load instruction is issued to the second execution pipeline.

3. The method of claim 1, wherein the first load instruction is issued in a first common issue group and wherein the second load instruction is issued in a second common issue group.

4. The method of claim 3, wherein the first load instruction and the second load instruction are issued to a same execution pipeline within the first common issue group and the second common issue group, respectively.

5. The method of claim 1, wherein the first load instruction and the second load instruction are dependent load instructions, wherein first data loaded with the first load instruction is used by the second load instruction to load second data.

6. The method of claim 1, wherein the cache is a single port cache.

7. The method of claim 1, wherein the cache is capable of only performing a single access operation at a time.

8. The method of claim 1, wherein the first load instruction and the second load instruction are executed in program order.

9. The method of claim 1, wherein, after the first load instruction and the second load instruction have been issued from an issue queue, the second load instruction is maintained in a delay queue for at least a period of time during which the first load instruction is being executed.

10. The method of claim 1, wherein the first load instruction is executed in a delayed manner with respect to a third instruction with which the first load instruction conflicts.

11. A processor comprising:
a cache;
a cascaded delayed execution pipeline unit having at least a first execution pipeline and a second execution pipeline, wherein the first execution pipeline executes an instruction in a common issue group in a delayed manner relative to another instruction in the common issue group executed in the second execution pipeline; and
circuitry configured to:
  receive a first load instruction and a second load instruction;
  issue the first load instruction and the second load instruction to the cascaded, delayed execution pipeline;
  access the cache by executing the first load instruction and the second load instruction, wherein the circuitry is configured to schedule a delay between execution of the first load instruction and the second load instruction, thereby allowing the cache to complete the access with the first load instruction before beginning the access with the second load instruction; and
  wherein the first load instruction and the second load instruction are decoded and scheduled for execution after the first load instruction and the second load instruction are fetched from a level two cache and before the first load instruction and the second load instruction are placed in a level one cache.

12. The processor of claim 11, wherein the circuitry is configured to issue the first load instruction and the second load instruction in a common issue group, wherein the first load instruction is issued to the first execution pipeline and wherein the second load instruction is issued to the second execution pipeline.

13. The processor of claim 11, wherein the circuitry is configured to issue the first load instruction in a first common issue group and the second load instruction in a second common issue group.

14. The processor of claim 13, wherein the first load instruction and the second load instruction are issued to a same execution pipeline within the first common issue group and the second common issue group, respectively.

15. The processor of claim 11, wherein the first load instruction and the second load instruction are dependent load instructions, wherein first data loaded with the first load instruction is used by the second load instruction to load second data.

16. The processor of claim 11, wherein the cache is a single port cache.

17. The processor of claim 11, wherein the cache is capable of only performing a single access operation at a time.

18. The processor of claim 11, wherein the processor is configured to execute first load instruction and the second load instruction in program order.

19. The processor of claim 11, further comprising:
an issue queue; and
a delay queue; wherein, after the first load instruction and the second load instruction have been issued from the issue queue, the delay queue is configured to maintain the second load instruction in the delay queue for at least a period of time during which the first load instruction is being executed.

20. The processor of claim 11, wherein circuitry is configured to schedule the first load instruction to be executed in a delayed manner with respect to a third instruction with which the first load instruction conflicts.

21. A method of executing instructions in a processor, the method comprising:
receiving a first load instruction and a second load instruction in a common issue group;
issuing the first load instruction and the second load instruction to a cascaded delayed execution pipeline unit having at least a first execution pipeline and a second execution pipeline, wherein the second execution pipeline executes the second load instruction in the common issue group in a delayed manner relative to the first load instruction in the common issue group executed in the first execution pipeline;
after the first load instruction and the second load instruction have been issued from an issue queue, maintaining the second load instruction in a delay queue for at least a period of time during which the first load instruction is being executed;
accessing a cache by executing the first load instruction and the second load instruction, wherein a delay between execution of the first load instruction and the second load instruction provided by the delay queue allows the cache to complete the access with the first load instruction before beginning the access with the second load instruction;
and
wherein the first load instruction and the second load instruction are decoded and scheduled for execution after the first load instruction and the second load instruction are fetched from a level two cache and before the first load instruction and the second load instruction are placed in a level one cache.

22. The method of claim 21, wherein the first load instruction and the second load instruction are dependent load instructions, wherein first data loaded with the first load instruction is used by the second load instruction to load second data.

23. The method of claim 21, wherein the cache is a single port cache.

24. The method of claim 21, wherein the cache is capable of only performing a single access operation at a time.

25. The method of claim 21, wherein the first load instruction and the second load instruction are executed in program order.

26. The method of claim 21, wherein the first load instruction is executed in a delayed manner with respect to a third instruction with which the first load instruction conflicts.

* * * * *